United States Patent [19]

Alder

[11] Patent Number: 5,132,882
[45] Date of Patent: Jul. 21, 1992

[54] AUXILIARY BRAKE LAMP FOR MOTOR VEHICLES

[75] Inventor: Dietmar Alder, Geseke, Fed. Rep. of Germany

[73] Assignee: Hella KG Hueck & Co., Lippstadt, Fed. Rep. of Germany

[21] Appl. No.: 783,816

[22] Filed: Oct. 29, 1991

[30] Foreign Application Priority Data

Nov. 9, 1990 [DE] Fed. Rep. of Germany ....... 4035639

[51] Int. Cl.⁵ .............................................. B60Q 1/26
[52] U.S. Cl. ................................... 362/80.1; 362/226;
362/249; 362/368; 362/396
[58] Field of Search .................... 362/61, 80, 80.1, 226,
362/249, 368, 396; 340/464, 479; 439/573, 611

[56] References Cited

U.S. PATENT DOCUMENTS

| | | |
|---|---|---|
| 4,703,398 | 10/1987 | Huth et al. ............... 362/80.1 X |
| 4,893,220 | 1/1990 | Kakidaira ...................... 362/80.1 |
| 5,050,051 | 9/1991 | Machida et al. .................. 362/80.1 |

FOREIGN PATENT DOCUMENTS

3538361C1 9/1986 Fed. Rep. of Germany .

Primary Examiner—Stephen F. Husar
Attorney, Agent, or Firm—Griffin Branigan & Butler

[57] ABSTRACT

An auxiliary brake lamp for motor vehicles comprises a holder which includes a track (7) which has a double-T-shape in cross section and which is adherable to a rear window. A lamp housing (2) is engagingly shoved onto the holder. A holding spring (5) arranged in the lamp housing clamps a first flange of the double-T-track between it and the housing. An electrical coupling of the lamp to a vehicle power supply is provided by a flat plug engagement device (12). That is, the double-T-track is electrically coupled with a current source of the motor vehicle and the holding spring is electrically coupled with a light bulb (17) of the lamp. A contact plate formed as a flat lug (11) as part of the first flange of the double-T-track produces a conductive coupling between the lamp and the holder by sliding contact on the holding spring.

10 Claims, 2 Drawing Sheets

AUXILIARY BRAKE LAMP FOR MOTOR VEHICLES

BACKGROUND OF THE INVENTION

This invention relates to auxiliary brake lamps for motor vehicles of a type having a holder comprising a track with a double-T-shaped cross section which is adherable to a rear window or windshield. A lamp housing is engagingly shoved, or slid, onto the holder. A holding spring is arranged in the lamp housing which clamps a first flange of the double-T track between it and the housing. A connection of the lamp with a vehicle power supply can be provided by a flat receptacle, or plug engagement device.

Interior lamps of this type known in the art are depicted in FIGS. 4 and 5. It is shown therein by a cross section, lengthwise and perpendicular to a holder, how a lamp housing 26 is attached to a rear window 27 by means of a holder formed as a double-T-track 28. In this arrangement a holding spring 32 only has mounting related functions. A second flange 29 of the double-T-track 28 is adhered, or attached, to the rear window, or windshield, 27 while a first flange 30 is gripped by edges 31 of the lamp housing 26 which form a groove, or notch, therebetween. The holding spring 32 thereby presses against the first flange 30 from below while pressure is applied by edges 31 to edges of the first flange 30 from above. For purposes of coupling to a vehicle power supply an additional housing opening is necessary at a rear side of the lamp housing 26, not further shown here, so that an electrical plug, or receptacle, can be introduced which includes an electrical coupling to a light bulb.

It is an object of this invention to provide a current coupling to this lamp in such a manner that an electrical contact self-guidingly results upon mounting the lamp housing on a portion of the lamp holder fixedly attached to the rear window, that upon changing bulbs no further electrical coupling to the lamp housing is necessary and that the current supply is short and close to the rear window.

SUMMARY OF THE INVENTION

According to principles of this invention, a double-T-track holder is electrically couplable with a current source of a motor vehicle, a holding spring is electrically coupled with a light bulb of a lamp, and a contact plate formed as a flat lug on a first flange of the double-T-track holder produces an electrical coupling between the holder and the lamp by sliding contact with the holding spring.

BRIEF DESCRIPTION OF THE DRAWING

The foregoing and other objects, features and advantages of the invention will be apparent from the following more particular description of a preferred embodiment of the invention, as illustrated in the accompanying drawings in which reference characters refer to the same parts throughout the drawings. The drawings are not necessarily to scale, emphasis instead being placed upon illustrating principles of the invention in a clear manner.

DESCRIPTION OF A PREFERRED EMBODIMENT

Figure 1:
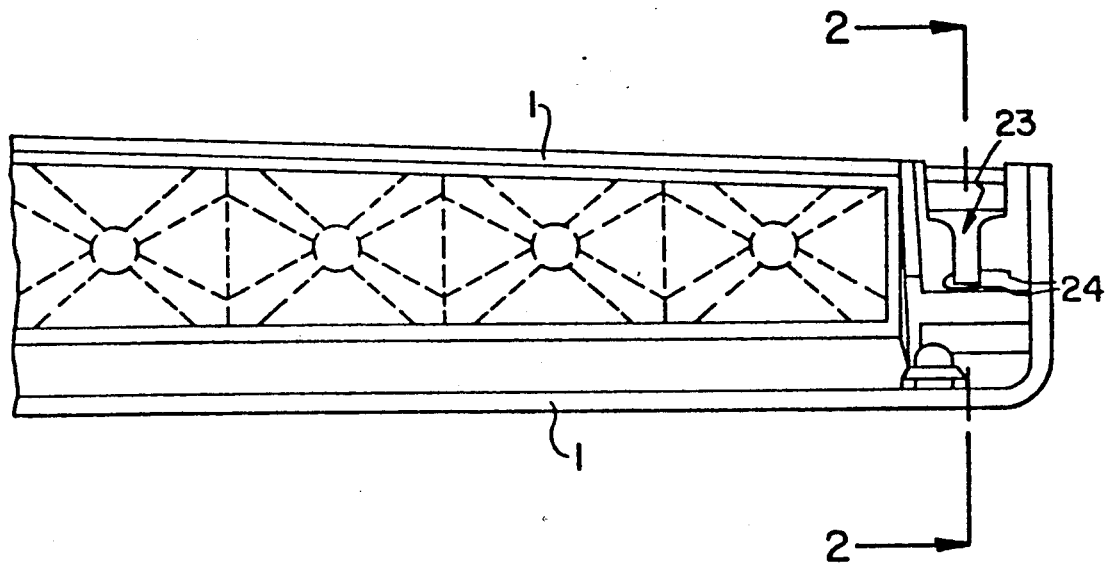
FIG. 1 is a view of an auxiliary brake lamp of this invention in a mounted position as seen from a rear of a vehicle on which it is mounted, but without a mounting support being shown.
Figure 2:
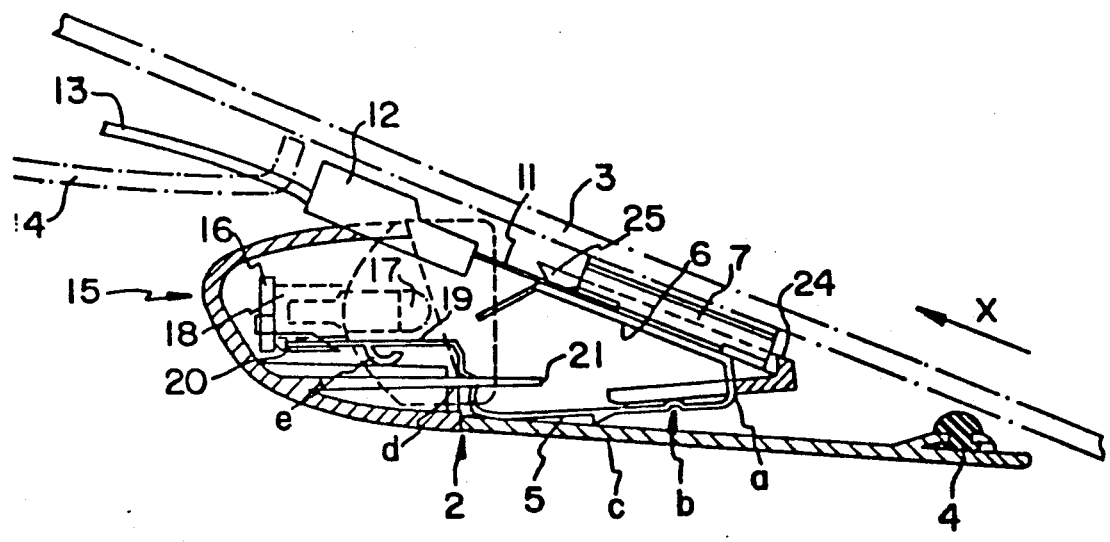
FIG. 2 is a simplified cross section taken on line 2—2 in FIG. 1 with a holder assembly, relative positions of individual lamp devices being represented by dashed lines.
Figure 3:
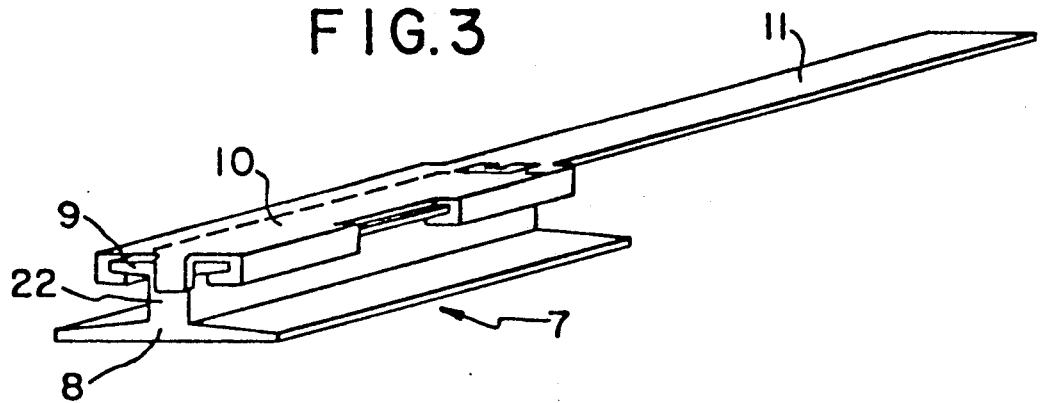
FIG. 3 is an enlarged perspective view of a double-T track holder of the holder assembly including a clamped on flat lug contact plate.
Figure 4:
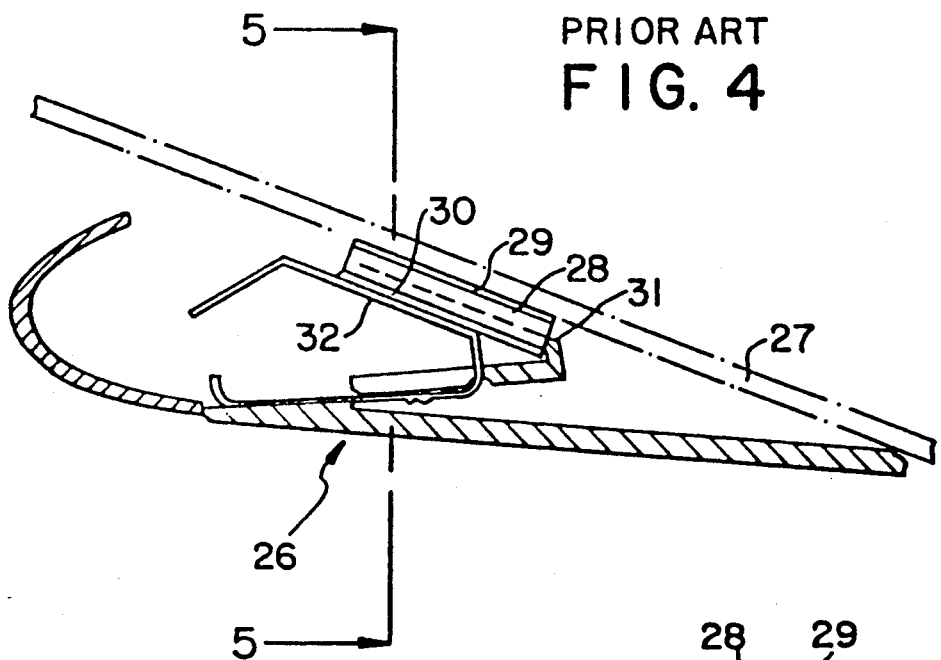
FIG. 4 is a simplified lengthwise cross sectional view of a mounting support of a prior art interior lamp with a housing of the lamp.
Figure 5:
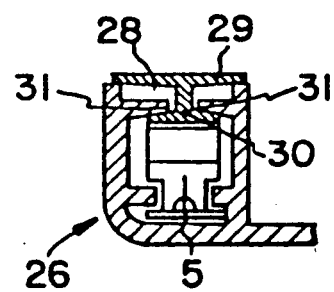
FIG. 5 is a segmented cross sectional view taken on line 5—5 in FIG. 4.

The auxiliary brake lamp depicted in FIGS. 1 and 2 lies with a rim 1 of its lamp housing 2, which is adapted to a slant of a rear window, or windshield, 3 on the rear window 3 with rubber cushions 4 on both sides thereof. A holding spring 5 is arranged within the lamp housing 2 on each of opposite sides thereof which is affixed to the housing 2 via holding points a, b, c, d, and e. In each area 6 of a first end of the holding spring 5 a relatively straight double-T track 7, arranged as a holder, is aligned with the holding spring 5, with its second flange 8 adjacent the lengthwise extension of the holding spring 5 in area 6 being adhered to the rear window 3. A contact plate 10 arranged as a flat plug, or lug, is clamped onto a part of the first flange 9 of the double-T track 7 with a plug lug 11 which comes into contact with the area 6 of the holding spring 5. A contact, plug engagement means, or receptacle, 12 is shoved on the plug lug 11 to provide electrical supply from a power supply of the motor vehicle. The receptacle 12 as well as its attached cable 13, are partially directly covered by the lamp housing 2 and a lining 14 of the interior space. In a rearward area of the lamp housing 2, a housing cover 15 can be removed from the rest of the mounted lamp housing 2 for purposes of changing bulbs. A sheet, or plate contact 16 is attached to the housing cover interconnecting the individual light bulbs 17 and their socket parts 18. To couple the plate contact 16 with the second end 19 of the holding spring 15, which is arranged as a flat plug, a flat apparatus, or a plug receiving device, 20 is provided. Upon mounting the housing cover 15 on the rest of the lamp housing 2, the aligned orientation of the second end 19 of the holding spring 5 with the flat plug receiving device 20 is maintained by means of a pin 21 formed on the housing cover 15 which, before connection with the flat plug receiving device 20 is achieved, threads through the holding spring 5 at holding point d for relatively positioning the holding spring 5 and producing a stressing at the holding point e against the lamp housing 2 which also leads to an exact positioning of the holding spring 5 upon engagement of the flat plug connection.

The lamp housing 2 further displays, on a side directed toward the rear window, two, spaced, parallel, and aligned with stems 22 of the double-T tracks 7, guiding grooves 23 having open ends and converging toward closed ends, which are shoved or slid in the X direction so that their edges 24 grip or engage behind the first flanges 9 on the stems 22 of the double-T tracks. The guiding grooves 23 have at their open ends, on both sides of the first-flange-gripping edges 24, bead-like thickenings 25 which engagingly grip behind front ends of the first flanges 9. For mounting the lamp, a double-T track 7, with the contact plate 10 attached thereto as part thereof, is adhered to the rear window 3 and the plug engagement device, or receptacle, 12 is engaged with the plug lug 11. Thereafter, the lamp housing 2 can be shoved or slid onto the first flange 9 of the double-T track 7 in the X direction so that the edges 24 defining the guiding groove 23 and the portion 6 of the first end of the holding spring 5 clamp the first flange 9 of the double-T track 7, including the contact plate 10, between them to a point where the thickening 25 of the edges 24 grip behind the front ends of the first flange 9 and thereby accomplishing engagement.

In beneficial embodiments of the invention the flat plug lug contact plate is interlocked, adhered, or welded onto the first flange of the double-T track. This makes possible choosing an optimal matching material for an electrical contact relationship of the holding spring which, in addition to aluminum, creates a minimal friction upon sliding.

With an embodiment in which the holding spring comes into contact with the contact plate over at least ⅔ of the length of the double-T-shaped track and the width of the contact plate corresponds to the width of the portion of the holding spring in contact with it, according to claims 3 and 4, it is assured that a sufficiently large surface for a rattle-free seating of the lamp, after mounting, is provided. Moreover, a relatively large flat seating of the contact plate on the holding spring provides a small transmission resistance.

With the structural limitations of claims 5 and 6 in which the lamp housing has two separate parts it is achieved that upon changing a light bulb the entire lamp must not be lifted from its holder on the rear window.

Further, it is beneficial that the electrical contact between the light bulbs and the holding spring is made by a detachable flat plug connection so that the electrical coupling of the housing-cover elements to elements of the rest of the housing is assured.

With the structural limitations of claims 8 and 9, the pre-requisites for a problem free threading of the flat plug second end of the holding spring in the flat plug receiving device is accomplished upon mounting the housing cover. The threading of the pin in the holding spring at holding point d hereby works for positioning these members and simultaneously creates, before the flat plug connection is made, a stressing of the holding spring at the holding point e so that also here a correct location positioning is accomplished for engagement of the flat plug connection.

With the arrangement of the brake light according to the structural limitations of claim 10, with double-T-tracks at both sides of the lamp, a more stable and more vibration resistant seating on the rear windshield of the motor vehicle is assured which simultaneously makes possible a separate application of energized and ground lines thereto.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

I claim:

1. An auxiliary brake lamp for a motor vehicle comprising:
    a) a holder including a track with a double-T-shaped cross section including an attachment means for attaching the track to a rear window,
    b) a lamp housing engagingly shoved onto said track,
    c) a holding spring arranged in said lamp housing for clamping a first flange of the track between it and said lamp housing,
    d) a plug-engagement means for coupling the lamp to an electrical circuit of the motor vehicle,
    e) the double-T-shaped track including a means for electrically coupling it with the plug engagement means,
    f) the holding spring being electrically coupled with a bulb in the lamp,
    g) the double-T-shaped track including a lug formed as a contact plate at the first flange of the double-T-shaped track producing the electrical coupling between the lamp and the holder by contact with the holding spring.

2. Auxiliary brake lamp as in claim 1 wherein the contact plate is arranged as a separate lug attached to the flange 9 of the double-T-shaped track 7.

3. An auxiliary lamp as in claim 1 wherein the holding spring in a contact area of a first end thereof comes into contact with the contact plate over at least ⅔ of the length of the double-T-shaped track.

4. Auxiliary brake light according to claim 1 wherein the width of the contact plate corresponds to the width of a portion of the holding spring in contact with it.

5. Auxiliary lamp according to claim 1 wherein the lamp housing has two separate parts.

6. Auxiliary brake lamp as in claim 5 wherein the lamp bulb is arranged in a removably attached second part while the holding spring is fixedly attached to a first housing part.

7. Auxiliary brake lamp according to claim 6 wherein the removably attached second part comprises a housing cover and an electrical coupling between the lamp bulb and a second end of the holding spring is provided via a detachable plug receiving device.

8. Auxiliary brake lamp according to claim 3 wherein the holding spring in a portion of its second end engages the lamp housing for experiencing loading and positioning.

9. An auxiliary lamp as in claim 8 wherein an engaging mechanism for the holding spring is formed as a pin which is threadable through an opening in the holding spring and which is fixedly attached to the housing cover.

10. An auxiliary brake lamp as in claim 1 wherein the combination double-T-track, the contact plate, and the holding spring is present at at least both sides of the lamp housing.

* * * * *